(12) United States Patent
Chen et al.

(10) Patent No.: US 11,314,138 B2
(45) Date of Patent: Apr. 26, 2022

(54) DISPLAY DEVICE

(71) Applicant: AU OPTRONICS CORPORATION, Hsin-Chu (TW)

(72) Inventors: Chien-Chi Chen, Hsin-Chu (TW); Wang-Shuo Kao, Hsin-Chu (TW); Hao-Shiun Yang, Hsin-Chu (TW); Shang-Chiang Lin, Hsin-Chu (TW)

(73) Assignee: AU OPTRONICS CORPORATION, Hsin-Chu (TW)

(*) Notice: Subject to any disclaimer, the term of this patent is extended or adjusted under 35 U.S.C. 154(b) by 0 days.

(21) Appl. No.: 17/159,198

(22) Filed: Jan. 27, 2021

(65) Prior Publication Data
US 2021/0286205 A1   Sep. 16, 2021

(30) Foreign Application Priority Data

Mar. 11, 2020  (TW) .................................. 109107940
Oct. 21, 2020  (CN) .......................... 202011134244.0

(51) Int. Cl.
| | |
|---|---|
| *G02F 1/1335* | (2006.01) |
| *G02F 1/139* | (2006.01) |
| *G02B 5/30* | (2006.01) |
| *G02F 1/01* | (2006.01) |
| *G02F 1/13363* | (2006.01) |

(52) U.S. Cl.
CPC .......... *G02F 1/139* (2013.01); *G02B 5/3083* (2013.01); *G02F 1/0136* (2013.01); *G02F 1/133543* (2021.01); *G02F 1/133638* (2021.01); *G02F 2203/48* (2013.01)

(58) Field of Classification Search
CPC ......... G02F 1/133507; G02F 1/133528; G02F 1/133543; G02F 1/13363; G02F 1/133634; G02F 1/133635; G02F 1/133638; G02F 1/139; G02F 1/0136; G02F 1/13725; G02F 2203/48; G02F 2413/02; G02F 2413/06; G02B 5/3083
See application file for complete search history.

(56) References Cited

U.S. PATENT DOCUMENTS 9,823,485 B2   11/2017  Kim et al.

*Primary Examiner* — Thoi V Duong
(74) *Attorney, Agent, or Firm* — WPAT, PC

(57) ABSTRACT

The present invention provides a display device including a display panel having a display surface, a polarizer disposed on the display surface, a first phase retardation layer disposed on one side of the polarizer opposite to the display surface, a polymerized cholesteric material layer disposed on one side of the first phase retardation layer opposite to the display surface, a second phase retardation layer disposed on one side of the polymerized cholesteric material layer opposite to the display surface, and a switchable polarizer disposed on one side of the second phase retardation layer opposite to the display surface. A first optical axis of the first phase retardation layer is orthogonal to a second optical axis of the second phase retardation layer. A first absorption axis of the polarizer is in the same direction as a second absorption axis of the switchable polarizer. The polarity of the switchable polarizer can be turned on or off according to a display state or a non-display state of the display panel, respectively.

16 Claims, 5 Drawing Sheets

DISPLAY DEVICE

BACKGROUND

Technical Field

The present invention relates to a display device. Specifically, the present invention relates to a display device having a stacked structure including a phase retardation layer, a polymerized cholesteric material layer (PCM layer), and a polarizer.

Related Art

Environmental light is often reflected by a display device when the environmental light is incident on the display device. However, such a phenomenon may interfere with content displayed by the display device, and is adverse to display. In addition, in recent years, to improve aesthetic appeal or increase variability, more and more display devices are designed with special appearances. For example, in some display devices, a pattern or a texture may be provided in at least one layer of a stacked structure. As stated above, due to reflection of environmental light, such appearance designs may be unexpectedly perceived by a user when the display device is displaying, resulting in degradation of viewing experience of the user. Therefore, it is necessary to develop a display device that can reduce or avoid environmental light reflection in a display state, and that can normally present a preset appearance in a non-display state.

SUMMARY

Technical Means for Resolving Problems

To resolve the foregoing problems, an embodiment of the present invention provides a display device including a display panel having a display surface, a polarizer disposed on the display surface, a first phase retardation layer disposed on one side of the polarizer opposite to the display surface, a PCM layer disposed on one side of the first phase retardation layer opposite to the display surface, a second phase retardation layer disposed on one side of the PCM layer opposite to the display surface, and a switchable polarizer disposed on one side of the second phase retardation layer opposite to the display surface. The first phase retardation layer is configured to allow linearly polarized light passing therethrough to have phase retardation, so as to generate circularly polarized light or elliptically polarized light having preset optical activity (optical rotation). The PCM layer is configured to allow the circularly polarized light or elliptically polarized light having the preset optical activity to pass. The first phase retardation layer has a first optical axis, the second phase retardation layer has a second optical axis, and the second optical axis is orthogonal to the first optical axis. The polarity of the switchable polarizer can be turned on or off according to a display state or a non-display state of the display panel, respectively. The polarizer has a first absorption axis, and the switchable polarizer, when having the polarity, has a second absorption axis being in the same direction as the first absorption axis.

Benefits Compared to the Prior Art

According to the display device provided in the embodiments of the present invention, negative impact brought by that environmental light is reflected by the display device may be alleviated or avoided in a display state while maintaining presentation of a preset appearance, such as a texture or a pattern, of the display device in a non-display state. Therefore, according to the display device of the present invention, an appearance of the display device may be hidden in the display state, thereby improving display quality and user experience of the display device.

DETAILED DESCRIPTION

The following describes the embodiments of the present invention, and a person of ordinary skill in the art should easily understand the spirit and the principle of the present invention with reference to the accompanying drawings. However, although some specific embodiments are described in detail in the specification, the embodiments are merely illustrative and exemplary, and are not intended to be limitative and exhaustive in all aspects. Therefore, for a person of ordinary skill in the art, various variations and modifications to the present invention should be apparent and can be easily achieved without departing from the spirit and principle of the present invention.

Figure 1:
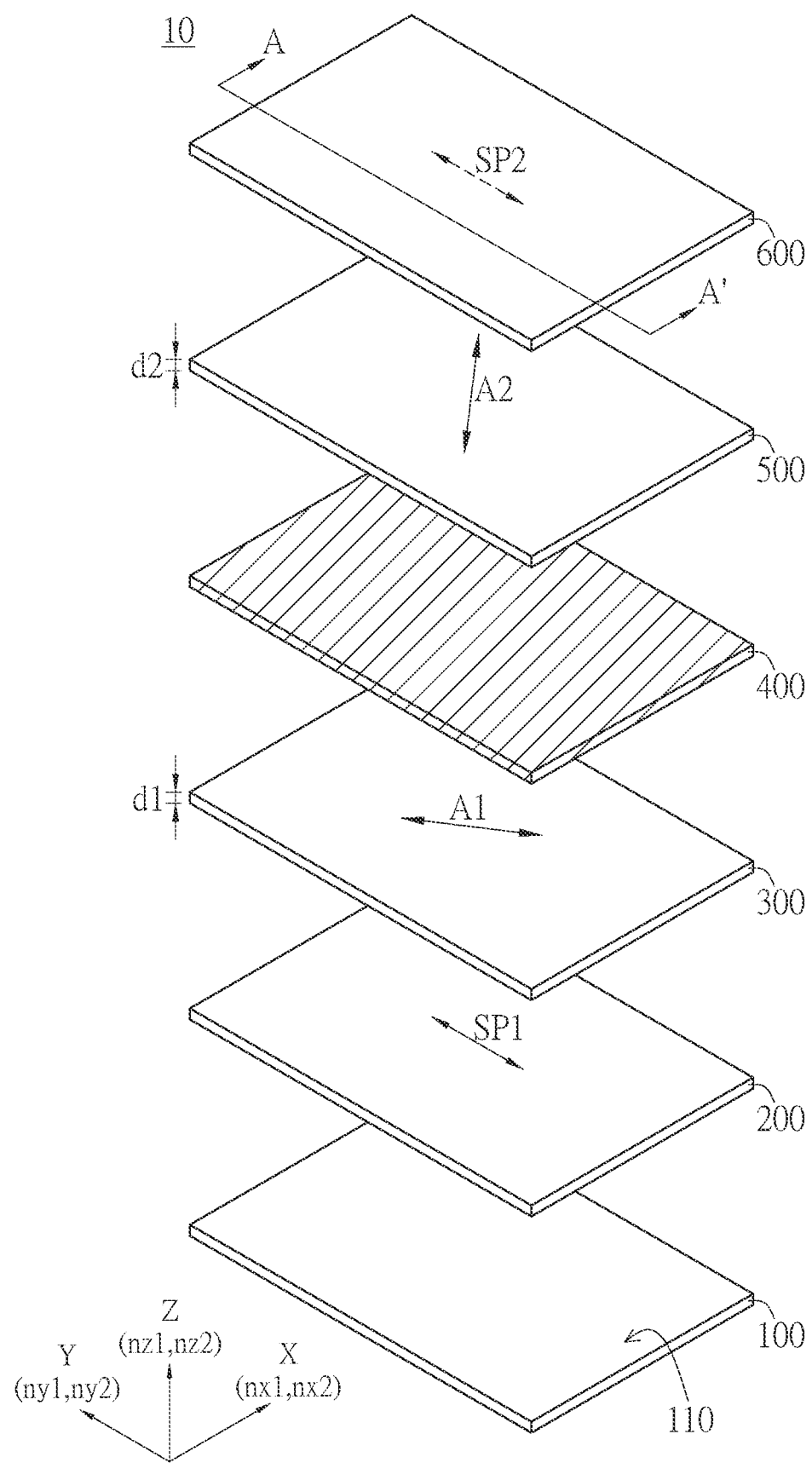
FIG. 1 is a three-dimensional disassembly diagram of a lamination of a display device according to an embodiment of the present invention.

Referring to FIG. 1, a display device 10 according to an embodiment of the present invention includes a display panel 100 having a display surface 110, a polarizer 200 disposed on the display surface 110, a first phase retardation layer 300 disposed on one side of the polarizer 200 opposite to the display surface 110, a PCM layer 400 disposed on one side of the first phase retardation layer 300 opposite to the display surface 110, a second phase retardation layer 500 disposed on one side of the PCM layer 400 opposite to the display surface 110, and a switchable polarizer 600 disposed on one side of the second phase retardation layer 500 opposite to the display surface 110.

Specifically, according to this embodiment, the display panel 100 may be any panel that can emit display light or allow display light to be emitted, for example, but not limited to, a liquid crystal display panel, an organic light emitting display panel, or an electroluminescent display panel. In addition, the polarizer 200 disposed on the display panel 100 may be any element that can convert light emitted from the display panel 100 into linearly polarized light, and may have a first absorption axis SP1. In contrast, the switchable polarizer 600 at the uppermost layer of the display device 10 in this embodiment may be any element of which the polarity can be controllably switched, and when having the polarity, have a second absorption axis SP2 being in the same direction as the first absorption axis SP1. For example, the polarity of the switchable polarizer 600 can be turned on or off according to a display state or a non-display state of the display panel 100, respectively. Therefore, without any further restriction or property change, linearly polarized light that can pass through the polarizer 200 can also pass through the switchable polarizer 600 in a state of having polarity.

In this case, the switchable polarizer 600 may be, for example, an electrically controllable liquid crystal layer, a twisted nematic (TN) cell layer, or an electrically controlled birefringence (ECB) cell layer. However, the above are merely examples, and the present invention is not limited thereto.

Furthermore, the first phase retardation layer 300 disposed on one side of the polarizer 200 opposite to the display panel 100 may be any element that can allow linearly polarized light passing therethrough to have phase retardation, and has a first optical axis A1. For example, the first phase retardation layer 300 may be a quarter wave plate (QWP), or a lamination of a QWP and a half wave plate (HWP). Alternatively, the first phase retardation layer 300 may be a preset material layer. The preset material layer is made of a preset material of which Nz=0.4-0.6 and R0=100-200 nm, where Nz=(nx1−nz1)/(nx1−ny1), and R0=(nx1−ny1)×d1. nx1 and ny1 are refractive indices of the preset material layer serving as the first phase retardation layer 300 in two directions parallel to the display surface 110, nz1 is a refractive index of the preset material layer serving as the first phase retardation layer 300 in a direction perpendicular to the display surface 110, and d1 is a thickness of the preset material layer serving as the first phase retardation layer 300 in the direction perpendicular to the display surface 110, that is, the thickness in the direction Z shown in FIG. 1. For example, nx1 may be a refractive index of the first phase retardation layer 300 in a direction parallel to a width direction of the display surface 110, that is, the refractive index in the direction X shown in FIG. 1; ny1 may be a refractive index of the first phase retardation layer 300 in a direction parallel to a length direction of the display surface 110, that is, the refractive index in the direction Y shown in FIG. 1; and nz1 may be a refractive index of the first phase retardation layer 300 in a direction perpendicular to the display surface 110, that is, the refractive index in the direction Z shown in FIG. 1.

Further, according to an embodiment, an angle between the first absorption axis SP1 of the polarizer 200 and the first optical axis A1 of the first phase retardation layer 300 may be 45 degrees or 135 degrees.

As stated above, when linearly polarized light passes through the first phase retardation layer 300 to have preset phase retardation, circularly polarized light or elliptically polarized light having preset optical activity may be generated accordingly. For example, when the angle between the first absorption axis SP1 of the polarizer 200 and the first optical axis A1 of the first phase retardation layer 300 is 45 degrees or 135 degrees, circularly polarized light may be generated correspondingly when the linearly polarized light passing through the polarizer 200 passes through the first phase retardation layer 300.

According to some embodiments, to broaden a wide wave domain of light that passes, the lamination of a QWP and an HWP may be selected as the first phase retardation layer 300. In this way, it is possible to further alleviate a color shift phenomenon. However, provided that the linearly polarized light may be allowed to have phase retardation, according to other embodiments of the present invention, materials and components that can be used for manufacturing the first phase retardation layer 300 are not limited thereto.

Similarly, the second phase retardation layer 500 disposed on one side of the switchable polarizer 600 facing the display panel 100, the same as the first phase retardation layer 300, may be any element that allows linearly polarized light passing therethrough to have phase retardation, and has a second optical axis A2. For example, referring to the above description of the first phase retardation layer 300, the second phase retardation layer 500 may be a QWP, a lamination of a QWP and an HWP, or a preset material layer. The preset material layer is made of a material of which Nz=0.4-0.6 and R0=100-200 nm, where Nz=(nx2−nz2)/(nx2−ny2), and R0=(nx2−ny2)×d2. nx2 and ny2 are refractive indices of the preset material layer serving as the second phase retardation layer 500 in two directions parallel to the display surface 110, nz2 is a refractive index of the preset material layer serving as the second phase retardation layer 500 in a direction perpendicular to the display surface 110, and d2 is a thickness of the preset material layer serving as the second phase retardation layer 500 in the direction perpendicular to the display surface 110, that is, the thickness in the direction Z shown in FIG. 1. For example, nx2 may be a refractive index of the second phase retardation layer 500 in a direction parallel to a width direction of the display surface 110, that is, the refractive index in the direction X shown in FIG. 1; ny2 may be a refractive index of the second phase retardation layer 500 in a direction parallel to a length direction of the display surface 110, that is, the refractive index in the direction Y shown in FIG. 1; and nz2 may be a refractive index of the second phase retardation layer 500 in a direction perpendicular to the display surface 110, that is, the refractive index in the direction Z shown in FIG. 1.

Further, according to an embodiment, an angle between a second absorption axis SP2 of the switchable polarizer 600 and the second optical axis A2 of the second phase retardation layer 500 may be 45 degrees or 135 degrees.

As stated above, when the linearly polarized light passes through the second phase retardation layer 500 to have preset phase retardation, circularly polarized light or elliptically polarized light having preset optical activity may be generated accordingly. For example, when the angle between the second absorption axis SP2 of the switchable polarizer 600 and the second optical axis A2 of the second phase retardation layer 500 is 45 degrees or 135 degrees, circularly polarized light may be generated correspondingly when the linearly polarized light passing through the switchable polarizer 600 passes through the second phase retardation layer 500.

According to an embodiment of the present invention, the first optical axis A1 of the first phase retardation layer 300 may be substantially orthogonal to the second optical axis A2 of the second phase retardation layer 500. Therefore, phase retardation that is generated when passing through the first phase retardation layer 300 may be recovered when passing through the second phase retardation layer 500. Likewise, phase retardation that is generated when passing through the second phase retardation layer 500 may be recovered when passing through the first phase retardation layer 300.

According to this embodiment, the PCM layer 400 sandwiched between a lamination of the polarizer 200 and the first phase retardation layer 300 and a lamination of the switchable polarizer 600 and the second phase retardation layer 500 may has helix states with one or more pitches based on an arrangement and stacking mode therein. In this way, the circularly polarized light or elliptically polarized light having preset optical activity may be allowed to pass, and other light without the preset optical activity may be reflected. According to this embodiment, the preset optical activity is exactly preset optical activity of circularly polarized light or elliptically polarized light generated by light sequentially passing through the polarizer 200 and the first phase retardation layer 300, or preset optical activity of circularly polarized light or elliptically polarized light generated by light sequentially passing through the switchable polarizer 600 and the second phase retardation layer 500.

Therefore, as stated above, without any further restriction or property change, either circularly polarized light or elliptically polarized light generated by light sequentially passing through the polarizer 200 and the first phase retardation layer 300, or circularly polarized light or elliptically polarized light generated by light sequentially passing through the switchable polarizer 600 and the second phase retardation layer 500 can pass through the PCM layer 400.

In some embodiments, a pitch of a helix state of the PCM layer 400 may alternatively be changed based on electrical regulation or temperature regulation. In addition, the PCM layer 400 may alternatively be a PCM layer 400 of a cell of a controllable switch, and the present invention is not limited thereto.

According to an embodiment, when circularly polarized light or elliptically polarized light having a wider wave domain needs to be allowed to pass, the PCM layer 400 may have helix states with a plurality of pitches. For example, the PCM layer 400 having helix states with a plurality of pitches can cooperate with the first phase retardation layer 300 and/or the second phase retardation layer 500 each being a lamination of a QWP and an HWP, to always allow light in a wider wave domain to pass through the PCM layer 400 when the light passes through the first phase retardation layer 300 and/or the second phase retardation layer 500 to be converted into circularly polarized light or elliptically polarized light.

Figure 2A:
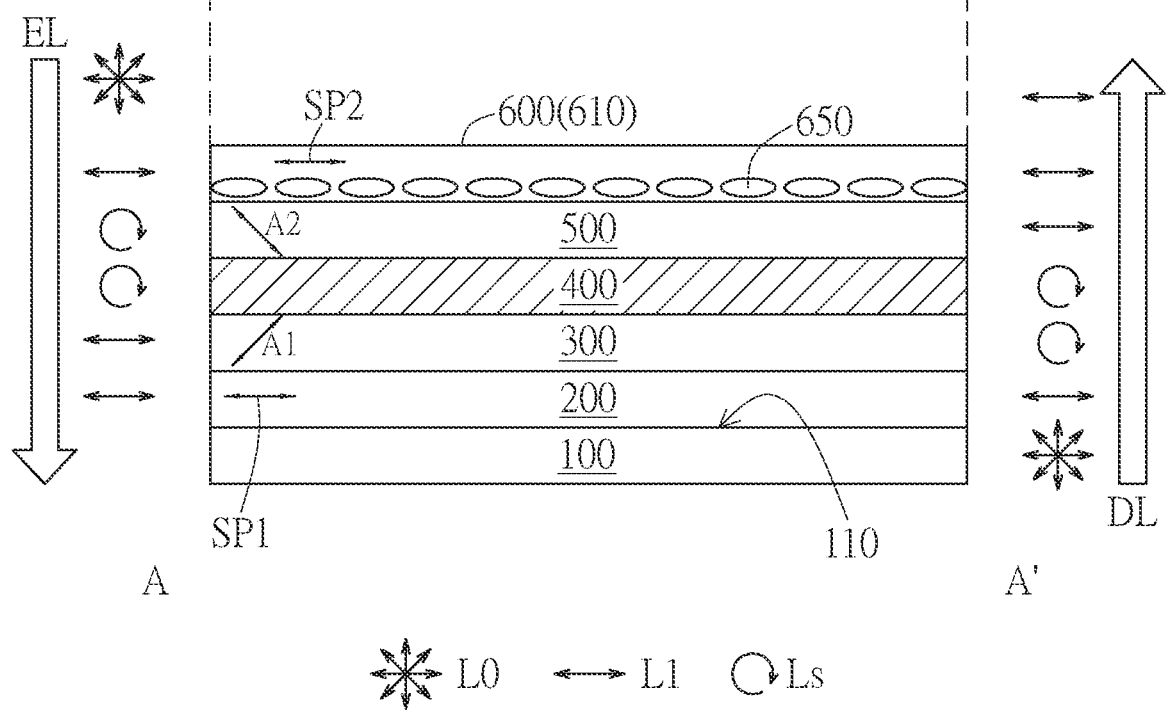
FIG. 2A is a schematic diagram illustrating light paths and light forms of environmental light and display light of a display device in a display state according to another embodiment of the present invention.
Figure 2B:
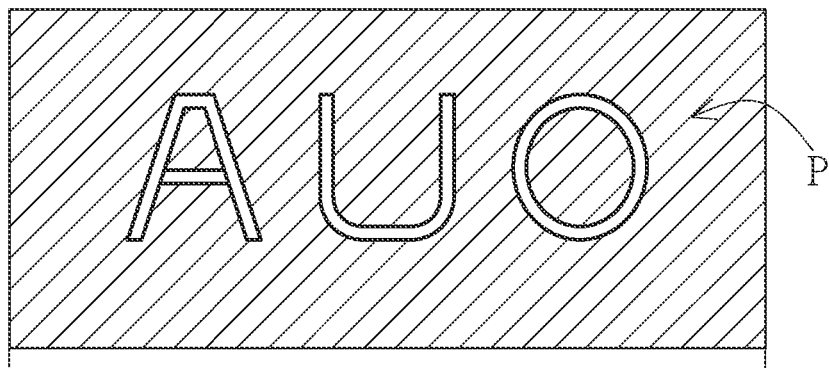
FIG. 2B is a schematic diagram illustrating a light path and a light form of environmental light of a display device in a non-display state according to still another embodiment of the present invention.
Figure 2B:
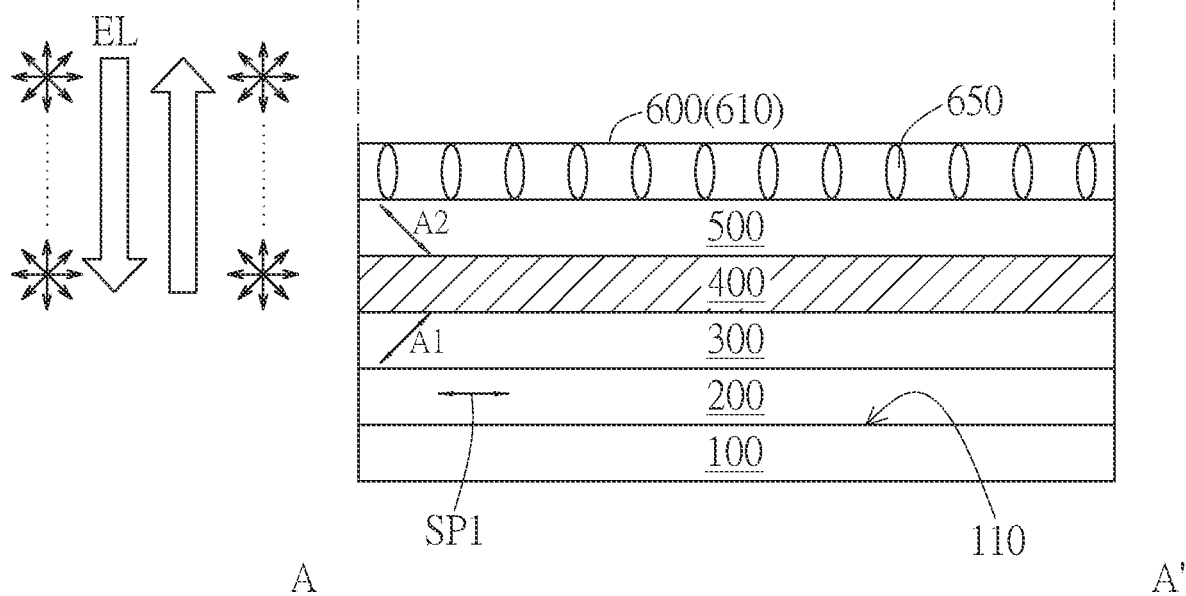

Referring to FIG. 2A and FIG. 2B, the following further describes an actual application of the display device having the foregoing structure, and details that are the same as or similar to those in the foregoing embodiment are not described again.

As stated above, according to another embodiment of the present invention, as shown in FIG. 2A and FIG. 2B, a display device 20 having a structure similar to that in FIG. 1 and taken along a direction of a section line A-A' shown in FIG. 1 may include a display panel 100 having a display surface 110, a polarizer 200 disposed on the display surface 110, a first phase retardation layer 300 disposed on one side of the polarizer 200 opposite to the display surface 110, a PCM layer 400 disposed on one side of the first phase retardation layer 300 opposite to the display surface 110, a second phase retardation layer 500 disposed on one side of the PCM layer 400 opposite to the display surface 110, and a switchable polarizer 600 disposed on one side of the second phase retardation layer 500 opposite to the display surface 110. The switchable polarizer 600 in this embodiment is a dye-doped liquid crystal layer 610, and includes a plurality of liquid crystal molecules 650. The liquid crystal molecules 650 may be switched, under the electrical control, to a horizontal state (the display state S1 shown in FIG. 2A) substantially parallel to the display surface 110 that turns on the polarity, or a vertical state (the non-display state S2 shown in FIG. 2B) substantially perpendicular to the display surface 110 that turns off the polarity.

As stated above, the polarizer 200 according to this embodiment may have a first absorption axis SP1. In addition, in the display state S1 of the display panel 100 of the display device 20 shown in FIG. 2A, lying directions of the liquid crystal molecules 650 in the horizontal state may be the same as an axial direction of the first absorption axis SP1 of the polarizer 200. Therefore, the switchable polarizer 600, when being switched to have the polarity, is allowed to have a second absorption axis SP2 being in the same direction as the first absorption axis SP1.

Next, the following further describes in detail the light paths and the light forms of an environmental light EL and a display light DL respectively passing through the display device 20 according to this embodiment.

As described above, first referring to FIG. 2A, when the display device 20 is turned on, such that the display panel 100 is in the display state S1, as shown in the right half part of FIG. 2A, display light DL emitted by the display panel 100 or emitted through the display panel 100 for displaying an expected video or image may be stray light L0. After leaving the display panel 100, the display light DL in the form of the stray light L0 first passes through the polarizer 200, and is converted into linearly polarized light L1 by a filtering effect of the polarizer 200 (having the first absorption axis SP1). Subsequently, display light DL in the form of the linearly polarized light L1 further passes through the first phase retardation layer 300 (having a first optical axis A1), and is converted into circularly polarized light or elliptically polarized light Ls based on a phase retardation effect (such as phase retardation of ¼λ) of the first phase retardation layer 300.

The display light DL that sequentially passes through the polarizer 200 and the first phase retardation layer 300 and therefore has the form of the circularly polarized light or elliptically polarized light Ls has preset optical activity (for example, but not limited to this, right-handed rotation), and the preset optical activity is the same as the preset optical activity of light that can pass through the PCM layer 400. Therefore, the display light DL having the preset optical activity can continue passing through the PCM layer 400.

Then, the display light DL passing through the PCM layer 400 further passes through the second phase retardation layer 500. Because the first optical axis A1 of the first phase retardation layer 300 is orthogonal to the second optical axis A2 of the second phase retardation layer 500, phase retardation of the display light DL based on the first phase retardation layer 300 is offset. In this way, the display light DL in the form of the circularly polarized light or elliptically polarized light Ls may be recovered into the form of the linearly polarized light L1.

As stated above, the display light DL in the form of the linearly polarized light L1 then passes through the switchable polarizer 600. Matching the display state S1, the switchable polarizer 600 is switched into a state of having the polarity, and has the second absorption axis SP2 being in the same direction as the first absorption axis SP1 of the polarizer 200. Therefore, the display light DL passing through the polarizer 200 and then sequentially passing through the first phase retardation layer 300, the PCM layer 400, and the second phase retardation layer 500 to be recovered into the form of the linearly polarized light L1 can also pass through the switchable polarizer 600.

In this way, referring to the upper half part of FIG. 2A, when the display device 20 is observed from one side of the switchable polarizer 600 opposite to the display surface 110 toward the display surface 110, a video or an image, such as a display picture M, can be seen. As described above, according to this embodiment, the display light DL may be emitted by passing through the stacked structure of the entire display device 20 to display a video or an image such as a display picture M.

Display light DL emitted from the display panel 100 at the beginning is in the form of the stray light L0. However, according to other embodiments, the display panel 100 may alternatively emit at the beginning display light DL purely in the form of the linearly polarized light L1 that can pass through the polarizer 200. As stated above, provided that the display light DL in the form of the linearly polarized light L1 may be generated through the polarizer 200, the form of the display light DL that can be emitted from the display panel 100 according to the embodiments of the present invention is not limited to the examples described herein in detail.

In addition, still referring to the left half part of FIG. 2A, in the display state S1, if unexpected environmental light EL is incident from the outside into the display device 20, reflection of the environmental light E1 by the display device 20 may also be alleviated or avoided according to this embodiment.

In detail, the environmental light EL, for example, may be environmental light EL in the form of the stray light L0, and may first pass through a switchable polarizer 600 that is switched to have the polarity at this moment. Based on the filtering effect of the switchable polarizer 600 having the second absorption axis SP2, the environmental light EL may be converted into environmental light EL in the form of the linearly polarized light L1 and continue proceeding. Then, similar to the case of the display light DL, the environmental light EL is further incident on the second phase retardation layer 500 having the second optical axis A2 to have phase retardation (for example, phase retardation of ¼λ). Therefore, the environmental light EL may be converted into circularly polarized light or an elliptically polarized light having preset optical activity. As stated above, the preset optical activity is the same as the preset optical activity of light that can pass through the PCM layer 400. Therefore, the environmental light EL having the preset optical activity may continue passing through the PCM layer 400 and entering.

Then, the environmental light EL passing through the PCM layer 400 further passes through the first phase retardation layer 300. Because the second optical axis A2 of the second phase retardation layer 500 is orthogonal to the first optical axis A1 of the first phase retardation layer 300, phase retardation of the environmental light EL based on the second phase retardation layer 500 is offset. In this way, the environmental light EL in the form of the circularly polarized light or elliptically polarized light Ls may be recovered into the form of the linearly polarized light L1. As stated above, the environmental light EL in the form of the linearly polarized light L1 then passes through the polarizer 200. The polarizer 200 has the first absorption axis SP1 being in the same direction as the second absorption axis SP2 of the switchable polarizer 600. Therefore, environmental light EL passing through the switchable polarizer 600 and then sequentially passing through the second phase retardation layer 500, the PCM layer 400, and the first phase retardation layer 300 to be recovered into the form of the linearly polarized light L1 may pass through the polarizer 200 and then, enter and pass though the display panel 100.

In this way, referring to the upper half part of FIG. 2A, when display is performed by the display light DL, there is no negative impact caused by the display device 20 unexpectedly reflecting the environmental light EL. For example, it is unlikely that the environmental light EL interferes or overlaps with the display light DL due to reflection of the environmental light EL. Alternatively, it is unlikely that, for example, an appearance of the PCM layer 400, such as a texture or a pattern of the PCM layer 400, inside the display device 20 is incongruously presented due to unexpected reflection of the environmental light EL. In particular, when the display picture M having a darker part or even a part in which the display light DL is not emitted is displayed as shown in FIG. 2A, negative impact, such as reflection of light or highlighting of a texture or a pattern of at least one stacked layer such as the PCM layer 400, caused by the unexpected reflection of the environmental light EL on such parts can be alleviated or avoided. Therefore, when the display device 20 is observed from one side of the switchable polarizer 600 opposite to the display surface 110 toward the display surface 110, display quality and viewing experience of a video or an image of the display picture M may be improved.

Next, referring to FIG. 2B, when the display panel 100 of the display device 20 is in a non-display state S2, the display panel 100 does not emit the display light DL. In this state, the switchable polarizer 600, such as the liquid crystal layer 610, may switch the liquid crystal molecules 650 to a vertical state substantially perpendicular to the display surface 110, to turn off the polarity (for example, becoming into a state of transmitting light in a full wave domain). Based on above, if environmental light EL is incident on the display device 20 in this case, referring to the left half part of FIG. 2B, the environmental light EL may directly pass through the switchable polarizer 600 having no polarity without being filtered or sifted. Therefore, for example, the environmental light EL in the form of the stray light L0 may enter the second phase retardation layer 500 in an original state. Because even if stray light L0 of non-linearly polarized light L1 has phase retardation (for example, phase retardation of ¼λ), the non-linearly polarized light L1 is not converted into the circularly polarized light or elliptically polarized light having the optical activity, after entering and passing through the second phase retardation layer 500, the environmental light EL may still be maintained in the form of the stray light L0 having no optical activity.

As stated above, when the environmental light EL in the form of the stray light L0 arrives at the PCM layer 400, at least a part or all of the environmental light EL cannot pass through the PCM layer 400 configured to allow circularly polarized light or elliptically polarized light having preset optical activity to pass. Therefore, the environmental light EL may be at least partially reflected by the PCM layer 400, then passes through the second phase retardation layer 500 along an original incident path, and is further emitted directly through the switchable polarizer 600 having no polarity.

In this way, referring to the upper half part of FIG. 2B, when the display device 20 is observed from one side of the switchable polarizer 600 opposite to the display surface 110 toward the display surface 110, a texture or a preset pattern, such as a pattern P, of the PCM layer 400 may be presented based on reflection of the environmental light EL. As described above, according to this embodiment, the display device 20 may be enabled to reveal an expected appearance when display is not performed.

Next, a display device according to other embodiments of the present invention is further described with reference to FIG. 3 to FIG. 5, and details that are the same as or similar to the foregoing embodiments are not described again.

Figure 3:
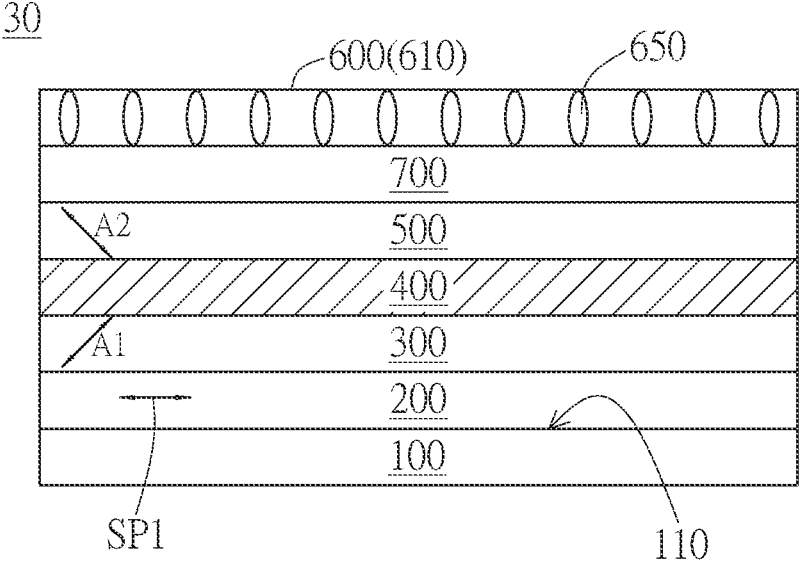
FIG. 3 is a schematic diagram of a lamination of a display device according to an embodiment of the present invention.

As stated above, referring to FIG. 3, according to an embodiment, a display device 30 may further include a compensation layer 700 disposed between the polarizer 200 and the switchable polarizer 600. For example, as shown in FIG. 3, the compensation layer 700 may be disposed between the second phase retardation layer 500 and the switchable polarizer 600, but is not limited thereto. Based on the above, the compensation layer 700 may be a single film layer or a multi-film layer of which an out-of-plane phase difference (Rth) is between 100 nm and 400 nm. In addition, according to some embodiments, linear retardation of the compensation layer 700 may be between 100 nm and 400 nm. In this way, excess phase retardation may be compensated before light passes through the switchable polarizer 600.

Specifically, in a display state, display light emitted from the display panel 100 at different viewing angles may have phase retardation when passing through layer structures, and consequently, it is difficult for some expected display light to pass through the switchable polarizer 600, and/or some unexpected display light passes through the switchable polarizer 600. For example, the display light may have phase retardation when passing through layers such as the PCM layer 400, and consequently, a characteristic of the display light further passing through the switchable polarizer 600 is affected, and a polarization state of the emitted display light may change. As described above, a difference of the display light passing through the switchable polarizer 600 may cause a difference on display picture at different viewing angles, for example, but not limited to, the display picture has a phenomenon, such as a color shift or light leakage, at a side viewing angle. However, according to this embodiment, because the compensation layer 700 is disposed between the polarizer 200 and the switchable polarizer 600, the foregoing phase retardation may be compensated for, so that display effects presented by light passing through the switchable polarizer 600 at different viewing angles tend to be more consistent, or the display effects at different viewing angles are closer to those of a state in which the first phase retardation layer 300, the PCM layer 400, and the second phase retardation layer 500 are not disposed.

According to some embodiments of the present invention, the compensation layer 700 may be, for example, but not limited to, a positive C-plate, an A-plate, or a biaxial film.

Figure 4A:
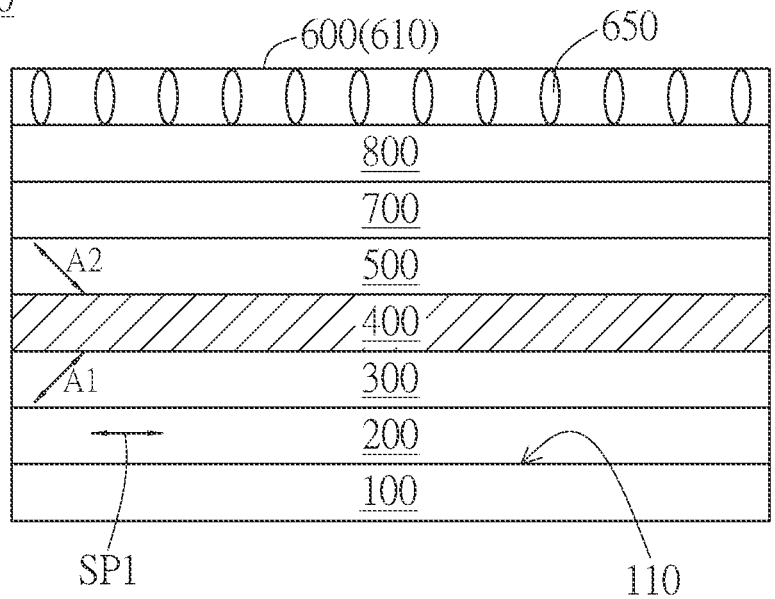
FIG. 4A is a schematic diagram of a lamination of a display device according to another embodiment of the present invention.
Figure 4B:
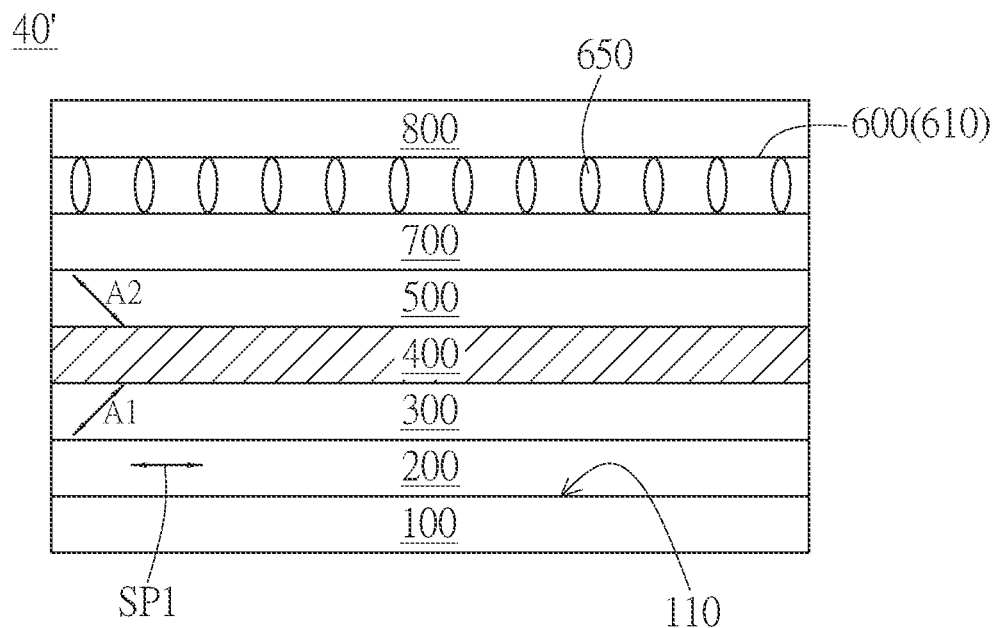
FIG. 4B is a schematic diagram of a lamination of a display device according to still another embodiment of the present invention.

Next, referring to FIG. 4A, a display device 40 according to another embodiment of the present invention may further include a light control film 800 directly or indirectly disposed on one side of the compensation film 700 opposite to the display surface 110. For example, the light control film 800 may be disposed such that the second phase retardation layer 500 is sandwiched between the light control film 800 and the PCM layer 400. In other words, the light control film 800 may be disposed to farther away from the display panel 100 than the second phase retardation layer 500. As stated above, the light control film 800 may have a property of diffusing light of the display panel 100 at a front viewing angle. For example, the light control film 800 includes a single refracting material layer or a plurality of refracting material layers, and the refractive index of the light control film 800 is between 1.4 and 1.7. By using such disposition and the property, the light control film 800 may further diffuse the light at the front viewing angle to other viewing angles without hindering effects of the first phase retardation layer 300, the PCM layer 400, the second phase retardation layer 500, and the compensation film 700. For example, the light control film 800 may further diffuse, in a display state, display light at a front viewing angle emitted from the display panel 100 to other viewing angles, thereby reducing or compensating for a display difference of emission at different viewing angle.

In a non-display state, the light control film 800 may also reduce or compensate for an appearance difference that may be caused by a reflection path difference when light is incident on the display device 40 and is reflected and emitted from different viewing angles. For example, if a pitch of the PCM layer 400 is designed or set to allow preset reflection of the PCM layer 400 to present a red, green, or blue appearance at a front viewing angle in the non-display state, the display device 40 may match environment decoration and be better integrated into the environment. In this case, because the environmental light is incident on the display device 40 and is reflected by the PCM layer 400, light rays reflected at different viewing angles, such as a side viewing angle, a color shift may occur relative to the front viewing angle based on Bragg's law. For example, the light is red at the front viewing angle and is green at the side viewing angle; the light is green at the front viewing angle and is blue at the side viewing angle; or the light is blue at the front viewing angle and is black at the side viewing angle. In other words, if the viewing angle is larger, the reflected light may be changed toward the short-wave band or the long-wave band to change the presented color. As stated above, according to this embodiment, the light control film 800 is further disposed, so that in the non-display state, the light reflected from the PCM layer 400 at the front viewing angle may be diffused to other viewing angles, thereby reducing or compensating for the foregoing appearance difference presented based on reflection at different viewing angles.

According to another embodiment of the present invention, the light control film 800 may not necessarily be disposed between the polarizer 200 and the switchable polarizer 600. For example, referring to FIG. 4B, similar to the display device 40, a light control film 800 may also be disposed in a display device 40', and a difference is that the light control film 800 may be directly or indirectly disposed on one side of the switchable polarizer 600 opposite to the display surface 110. As stated above, display light at a front viewing angle may be diffused by the light control film 800 to other viewing angles when display light is emitted from the display device 40', or reflected light at the front viewing angle that is incident on the display device 40' and is reflected may be diffused to other viewing angles in the non-display state. Therefore, according to this embodiment, a difference between display picture or appearances presented at different viewing angles may be reduced or compensated for.

Figure 5:
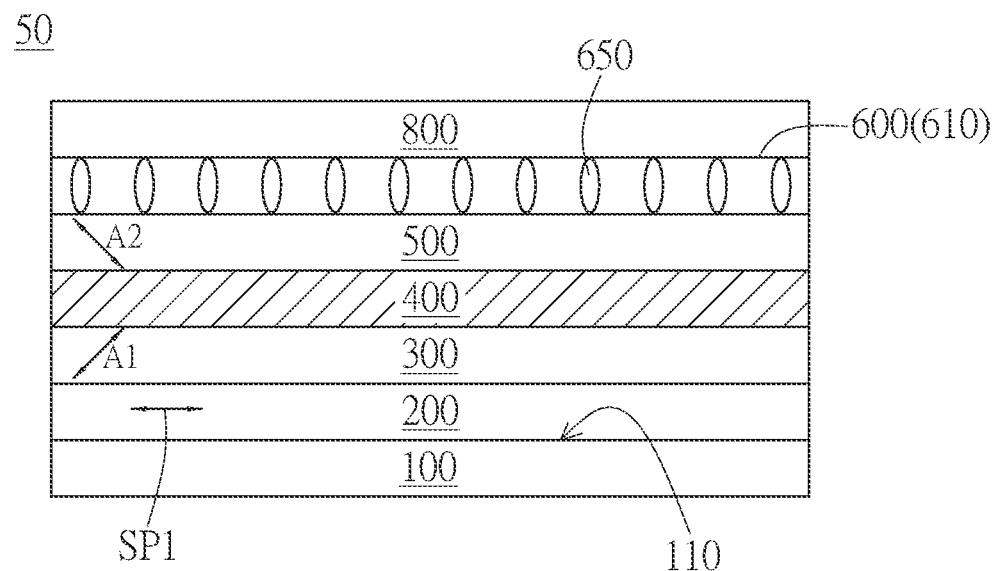
FIG. 5 is a schematic diagram of a lamination of a display device according to yet another embodiment of the present invention.

In addition, according to some embodiments, as shown in FIG. 5, alternatively, a compensation film 700 may not be disposed in a display device 50, and instead, only a light control film 800 is disposed. In this case, the light control film 800 may be disposed to farther away from the display panel 100 than the second phase retardation layer 500. By using such disposition and the property, the light control film 800 may further diffuse the light at the front viewing angle to other viewing angles without hindering effects of the first phase retardation layer 300, the PCM layer 400, and the second phase retardation layer 500. As stated above, this embodiment is the same as or similar to the embodiment shown in FIG. 4A and FIG. 4B, and the detailed content described above will not be described herein again.

Further, according to some embodiments, surface treatment may also be directly or indirectly performed on one side of the switchable polarizer 600 opposite to the display surface 110 (for example, on one side of the light control film 800 opposite to the display surface 110), so that surfaces of the display devices 10-50 of the embodiments have properties such as, but not limited to, anti-glare/anti-reflection (AG/AR). In this way, a display effect or appearance can be improved or a required display effect or appearance can be obtained. For example, a light diffusion effect may further be produced, so that display effects or appearances at different viewing angles are more consistent, but the present invention is not limited thereto.

In summary, through the display device of the embodiments of the present invention, negative impact, such as light reflection, display interference, or unexpected presentation of a component appearance, caused by the reflection of environmental light by the display device can be reduced or avoided in the display state. However, an expected appearance can still be presented in the non-display state. Therefore, according to the display device of the present invention, display quality and user experience of the display device can be improved.

The above are only some preferred embodiments of the present invention. It should be noted that various variations and modifications can be made to the present invention without departing from the spirit and principle of the present invention. A person of ordinary skill in the art should understand that the present invention is defined by the appended claims, and in accordance with the intent of the present invention, various possible changes, such as substitution, combination, modification, and conversion, all fall within the scope defined by the appended claims of the present invention.

SYMBOL DESCRIPTION

10, 20, 30, 40, 40', 50: Display device
100: Display panel
110: Display surface
200: Polarizer
300: First phase retardation layer
400: Polymerized cholesteric material layer
500: Second phase retardation layer
600: Switchable polarizer
610: Liquid crystal layer
650: Liquid crystal molecule
700: Compensation layer
800: Light control film
S1: Display state
S2: Non-display state
M: Display picture
P: Pattern
DL: Display light
EL: Environmental light
L0: Stray light
L1: Linearly polarized light
Ls: Circularly polarized light or elliptically polarized light
A1: First optical axis
A2: Second optical axis
SP1: First absorption axis
SP2: Second absorption axis
d1, d2: Thickness
nx1, nx2, ny1, ny2, nz1, nz2: Refractive index

What is claimed is:

1. A display device, comprising:
   a display panel, having a display surface;
   a polarizer, disposed on the display surface, and having a first absorption axis;
   a first phase retardation layer, disposed on one side of the polarizer opposite to the display surface, having a first optical axis, and configured to allow linearly polarized light passing therethrough to have phase retardation, so as to generate circularly polarized light or elliptically polarized light having preset optical activity;
   a polymerized cholesteric material layer (PCM layer), disposed on one side of the first phase retardation layer opposite to the display surface, and configured to allow the circularly polarized light or elliptically polarized light having the preset optical activity to pass;
   a second phase retardation layer, disposed on one side of the PCM layer opposite to the display surface, and having a second optical axis, wherein the second optical axis is orthogonal to the first optical axis; and
   a switchable polarizer, disposed on one side of the second phase retardation layer opposite to the display surface, wherein the polarity of the switchable polarizer is turned on or off according to a display state or a non-display state of the display panel, respectively, and the switchable polarizer, when having the polarity, has a second absorption axis being in the same direction as the first absorption axis.

2. The display device according to claim 1, wherein the switchable polarizer is an dye-doped liquid crystal layer, and comprises a plurality of liquid crystal molecules, wherein
   the liquid crystal molecules are switched, under the electrical control, to a horizontal state substantially parallel to the display surface that turns on the polarity, or a vertical state substantially perpendicular to the display surface that turns off the polarity, and lying directions of the liquid crystal molecules in the horizontal state are the same as an axial direction of the first absorption axis of the polarizer.

3. The display device according to claim 1, wherein the switchable polarizer is a twisted nematic (TN) cell layer or an electrically controlled birefringence (ECB) cell layer.

4. The display device according to claim 1, wherein the first phase retardation layer is selected from a group consisting of a quarter wave plate (QWP), a lamination of a QWP and a half wave plate (HWP), or a preset material layer, wherein
   the preset material layer is made of a preset material of which Nz=0.4-0.6 and R0=100-200 nm, wherein $Nz=(nx1-nz1)/(nx1-ny1)$, and $R0=(nx1-ny1)\times d1$, wherein nx1 and ny1 are refractive indices of the preset material layer serving as the first phase retardation layer in two directions parallel to the display surface, nz1 is a refractive index of the preset material layer serving as the first phase retardation layer in a direction perpendicular to the display surface, and d1 is a thickness of the preset material layer serving as the first phase retardation layer in the direction perpendicular to the display surface.

5. The display device according to claim 1, wherein the second phase retardation layer is selected from a group consisting of a QWP, a lamination of a QWP and an HWP, or a preset material layer, wherein
   the preset material layer is made of a preset material of which Nz=0.4-0.6 and R0=100-200 nm, wherein $Nz=(nx2-nz2)/(nx2-ny2)$, and $R0=(nx2-ny2)\times d2$ wherein nx2 and ny2 are refractive indices of the preset material layer serving as the second phase retardation layer in two directions parallel to the display surface, nz2 is a refractive index of the preset material layer serving as the second phase retardation layer in a direction perpendicular to the display surface, and d2 is a thickness of the preset material layer serving as the second phase retardation layer in the direction perpendicular to the display surface.

6. The display device according to claim 1, wherein both the first phase retardation layer and the second phase retardation layer are laminations of a QWP and an HWP, and the PCM layer has helix states with a plurality of pitches.

7. The display device according to claim 1, wherein an angle between the first absorption axis of the polarizer and the first optical axis of the first phase retardation layer is 45 degrees or 135 degrees.

8. The display device according to claim 1, wherein an angle between the second absorption axis of the switchable polarizer and the second optical axis of the second phase retardation layer is 45 degrees or 135 degrees.

9. The display device according to claim 1, wherein a pitch of a helix state of the PCM layer is changed based on electrical regulation or temperature regulation.

10. The display device according to claim 1, further comprising a compensation layer disposed between the polarizer and the switchable polarizer, wherein the compensation layer is a single film layer or a multi-film layer of which an out-of-plane phase difference (Rth) is between 100 nm and 400 nm.

11. The display device according to claim 10, wherein linear retardation of the compensation layer is between 100 nm and 400 nm.

12. The display device according to claim 10, wherein the compensation layer is a positive C-plate, an A-plate, or a biaxial film.

13. The display device according to claim 10, wherein the compensation layer is disposed between the second phase retardation layer and the switchable polarizer.

14. The display device according to claim 10, further comprising a light control film directly or indirectly disposed on one side of the compensation layer opposite to the display surface, the second phase retardation layer being sandwiched between the light control film and the PCM layer, wherein
    the light control film has a property of diffusing a light at a front viewing angle of the display panel.

15. The display device according to claim 14, wherein the light control film is directly or indirectly disposed on one side of the switchable polarizer opposite to the display surface.

16. The display device according to claim 14, wherein the light control film comprises a single refracting material layer or a plurality of refracting material layers, and the refractive index of the light control film is between 1.4 and 1.7.

* * * * *